March 22, 1966 M. E. SHELL 3,241,670
SEPARATING CONVEYOR WITH FEED MEANS
Filed Dec. 17, 1962 3 Sheets-Sheet 1

INVENTOR
Melvin E. Shell

BY
ATTORNEYS

March 22, 1966    M. E. SHELL    3,241,670
SEPARATING CONVEYOR WITH FEED MEANS
Filed Dec. 17, 1962    3 Sheets-Sheet 2
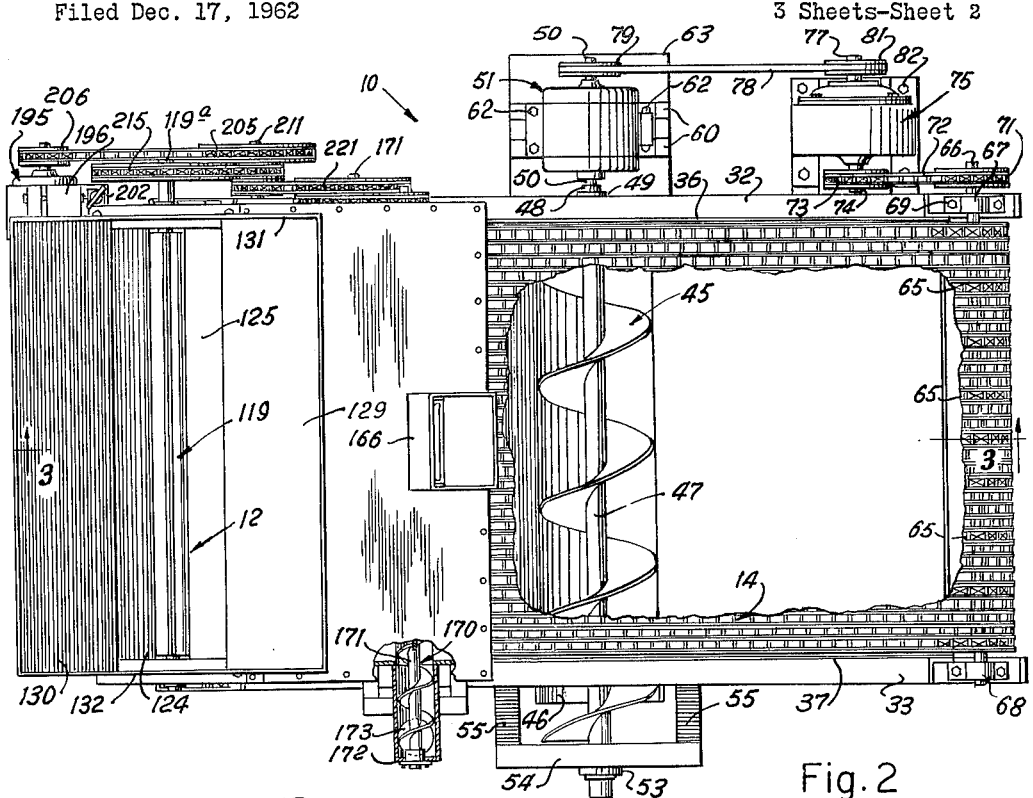
Fig. 2
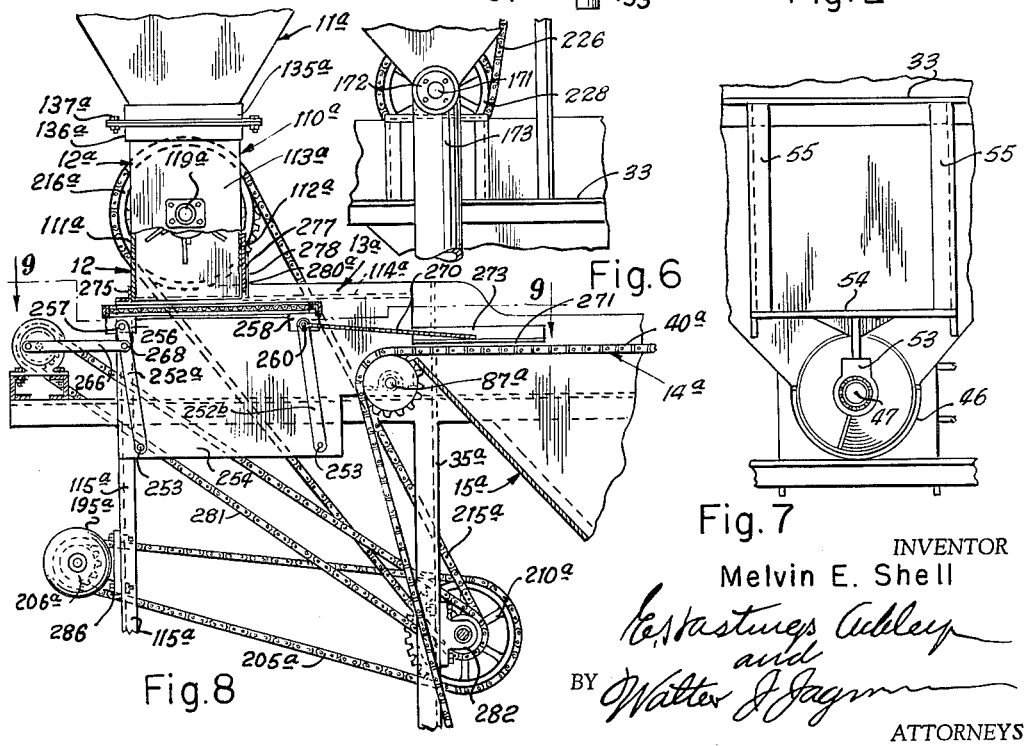
Fig. 6
Fig. 7
Fig. 8
INVENTOR
Melvin E. Shell
BY
ATTORNEYS

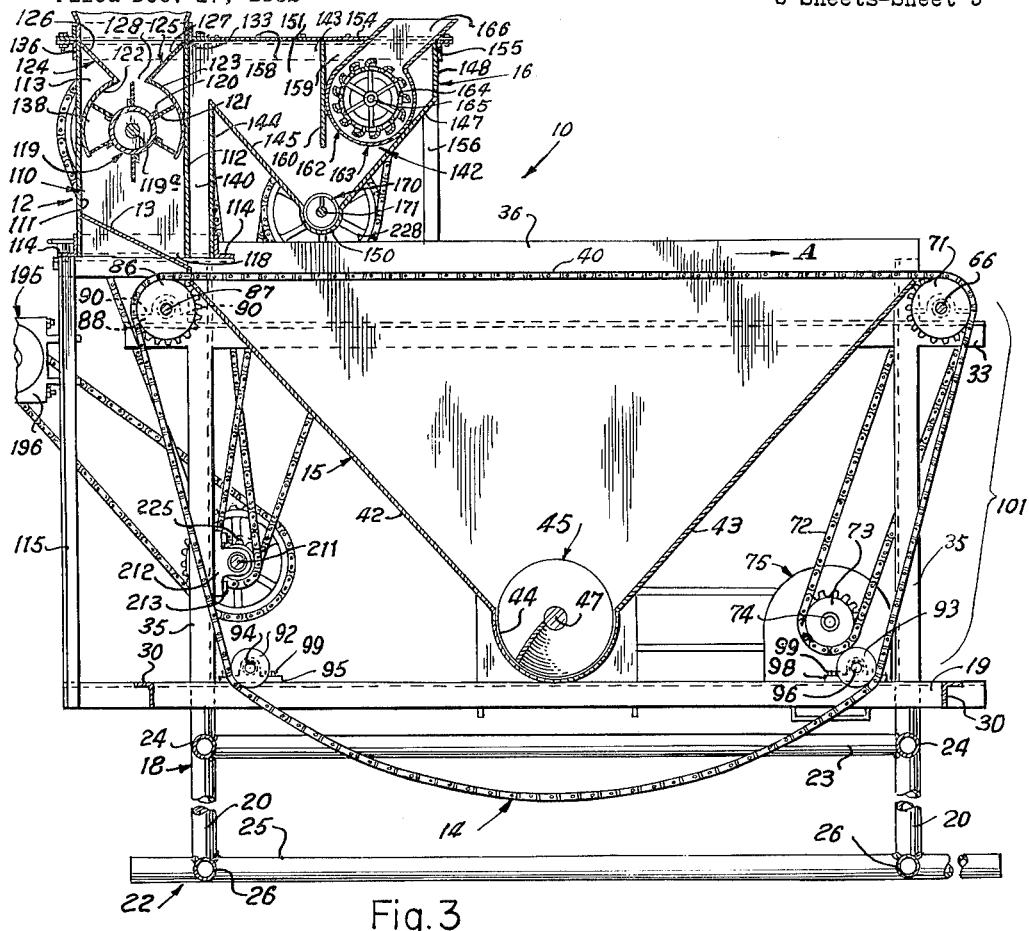
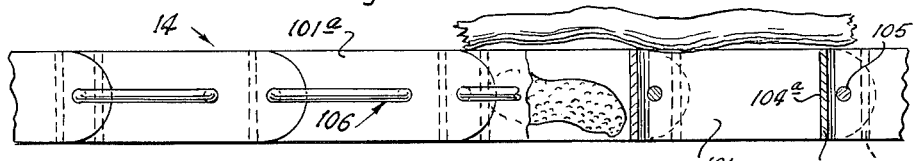
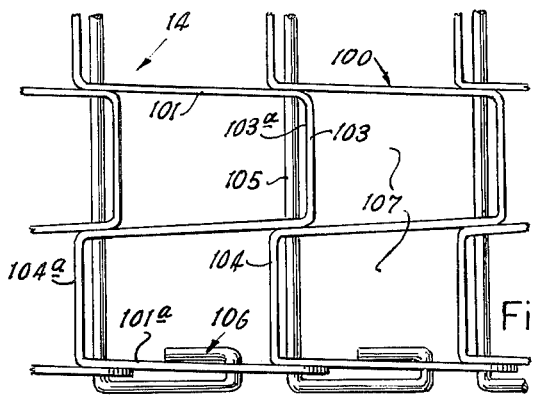
Fig. 3
Fig. 4
Fig. 5
INVENTOR
Melvin E. Shell
ATTORNEYS

United States Patent Office 3,241,670
Patented Mar. 22, 1966

3,241,670
SEPARATING CONVEYOR WITH FEED MEANS
Melvin E. Shell, P.O. Box 698, Gorman, Tex.
Filed Dec. 17, 1962, Ser. No. 245,193
2 Claims. (Cl. 209—243)

This invention relates to separating apparatus and more particularly to a separating apparatus for separating long objects, such as sticks, from short objects, such as peanuts.

An object of this invention is to provide a new and improved separating apparatus for separating long objects from short objects of equal or greater thickness than the long objects which deposits the mixture of short and long objects upon a screen conveyor moving in a substantially horizontal path which carries the long objects to a desired location and which permits the short objects to fall through the apertures or perforations thereof into a suitable bin or receptacle.

Another object is to provide a separating apparatus which includes a feed mechanism for depositing the mixture of objects on the screen conveyor which moves the mixture of objects in substantially the same direction as the direction of movement of the screen conveyor at the instant of its deposition on the screen conveyor but at a speed of movement in such direction appreciably slower than the speed of the screen conveyor so that the long objects are moved into longitudinal alignment with the direction of movement of and into horizontal position on the screen conveyor as their forward ends are engaged by the screen conveyor and do not fall vertically through the vertical apertures of the screen conveyor whose dimensions are greater than the thickness of such long objects.

Still another object is to provide a separating apparatus having a feed mechanism for feeding the mixture of short and long objects angularly downwardly onto the screen conveyor in the direction of movement of the conveyor at a speed of movement of such objects in the direction of movement of the conveyor slower than the speed of movement of the conveyor so that the movement of the objects is accelerated when their forward ends engage the screen conveyor whereby the forward ends of the objects are moved forwardly by the screen conveyor and cannot assume substantially vertical positions in which the long objects could fall longitudinally vertically through the vertical apertures of the screen conveyor.

A further object is to provide a separating apparatus for separating long objects, such as sticks, from short objects, such as peanuts, with which the long objects are intermixed, the cross-sectional dimensions or thickness of at least some of the sticks being smaller than the thickness of the peanuts, the apparatus including a screen conveyor having apertures of larger dimension than the cross-sectional dimensions of at least some of the sticks so that such sticks could pass through such apertures with the peanuts if permitted to assume substantially longitudinally vertical positions relative to the screen conveyor when deposited thereon by a feed mechanism.

A still further object is to provide a sorting apparatus wherein the apertures of the screen conveyor are defined by articulately connected transverse members having planar vertical sides which engage forward ends of the sticks to prevent the sticks from falling through the apertures if the sticks are moved in longitudinally angular positions by the feed mechanism onto the conveyor at a momentarily greater speed of movement than the speed of movement of the conveyor.

Another object is to provide a sorting machine for separating sticks, twigs or other debris intermixed with peanuts from the peanuts which has a dispensing means for dispensing the mixture onto a feed or slide plate inclined angularly downwardly toward a horizontal section of a screen conveyor in the direction of movement of the horizontal section for feeding the mixture onto the conveyor, the rate of dispensing of the mixture on the feed plate and the angle of the feed plate being such that the speed of movement of the screen conveyor is greater than the speed of movement of the mixture from the feed plate onto the screen conveyor whereby the sticks sliding off the plate onto the conveyor are prevented from falling through the apertures of the screen conveyor, the engagement of the transverse articulated members of the conveyor with the lower forward ends of such sticks as they move onto the conveyor accelerating the speed of movement of such forward ends of the sticks to cause the sticks to assume horizontal positions on the screen conveyor in longitudinal alignment with the direction of movement of the conveyor thus preventing the sticks from falling through the apertures of the screen conveyor.

Still another object is to provide a separating apparatus wherein the mixture is dispensed at a controlled rate from a feed hopper by a dispensing mechanism and at a predetermined rate relative to the speed of movement of the screen conveyor.

Still another object is to provide a separating apparatus having aspirator means for removing light debris from the mixture deposited on the screen conveyor, the aspirator means being adjacent and forward of the point of deposition of the mixture on the screen conveyor whereby such light debris is prevented from falling through the apertures of the screen conveyor.

A further object is to provide a sorting apparatus wherein the mixture of peanuts and sticks and other debris is deposited from the feed hopper upon a shaker screen having small perforations which permits objects smaller than the peanuts to fall therethrough, and the remaining large objects, sticks and peanuts are moved from the shaker screen onto a feed plate which directs such remaining portion of the mixture onto the screen conveyor.

Additional objects and advantages of the invention will be readily apparent from the reading of the following description of a device constructed in accordance with the invention, and reference to the accompanying drawings thereof, wherein:

FIGURE 2 is a top view, with some parts broken away, of the separating apparatus illustrated in FIGURE 1;

FIGURE 3 is a fragmentary sectional view taken on line 3—3 of FIGURE 2;

FIGURE 4 is a fragmentary enlarged side view, with some portions broken away, of the screen conveyor of the apparatus;

FIGURE 5 is a fragmentary top view of the screen conveyor;

FIGURE 6 is a fragmentary side view of the aspirator means of the separating apparatus;

FIGURE 7 is a fragmentary side view of a bin in which are received objects which fall through the openings of the screen conveyor;

FIGURE 8 is a fragmentary vertical sectional view, with some parts broken away, of a modified form of the separating apparatus embodying the invention.

Figures 1, 9:
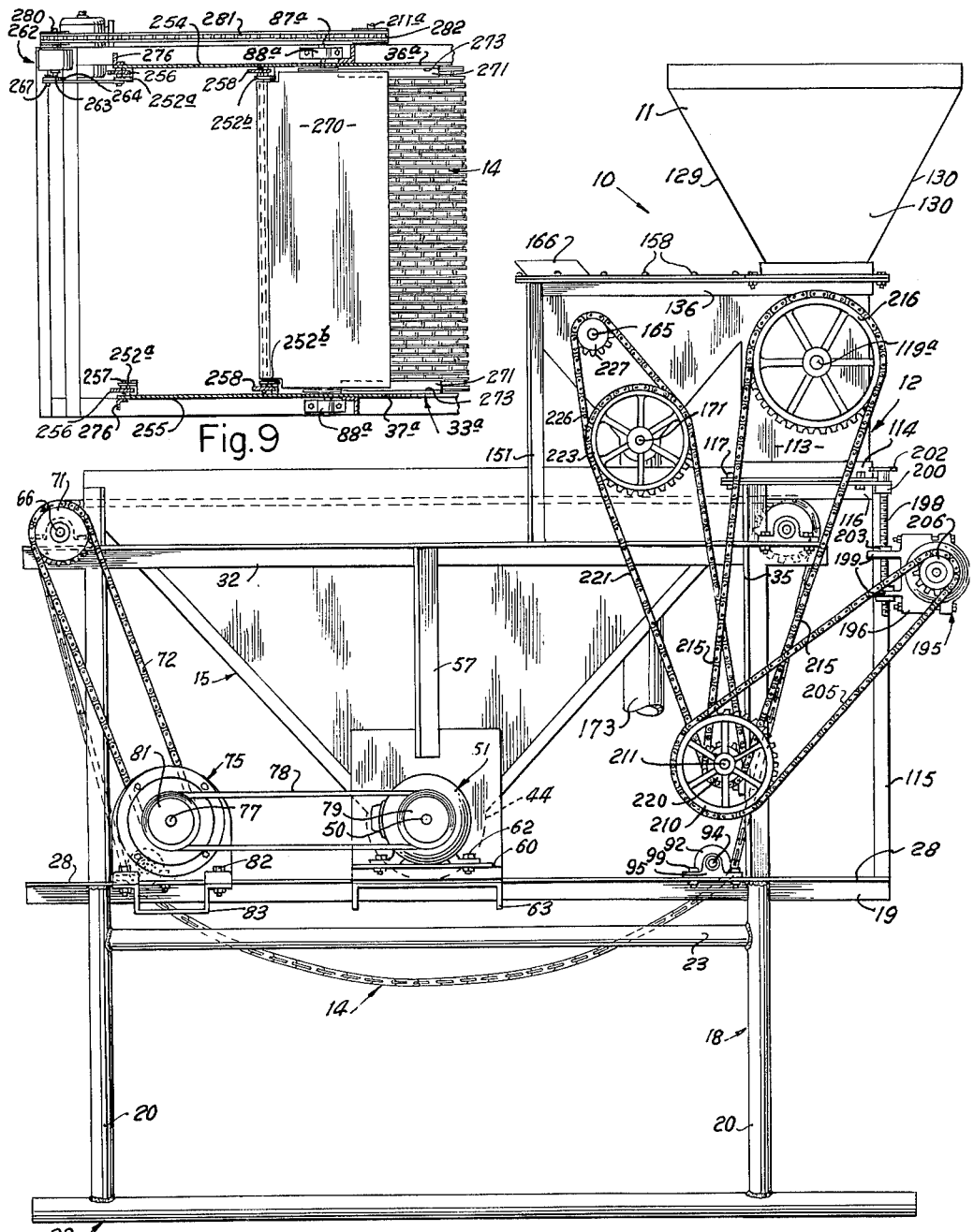
FIGURE 1 is a side view of a separating apparatus embodying the invention.
FIGURE 9 is a fragmentary sectional view taken on line 9—9 of FIGURE 8.

Referring now particularly to FIGURES 1 through 5 of the drawing, the separating apparatus 10 includes a storage hopper 11 into which the peanuts and the debris intermixed therewith are deposited, a dispensing device 12 for dispensing the mixture from the storage hopper 11 at a controlled rate onto a slide or feed plate 13 which is inclined angularly downwardly in the direction of movement of the upper portion of a screen conveyor 14 moving over a receptacle bin 15, an aspirator or suction device 16 for removing light debris from the peanuts as they move onto the conveyor off the feed plate, and a support frame 18 on which all operative elements of the sorting apparatus are mounted.

The frame 18 includes a pair of longitudinally extending lower angle members 19 supported by the four corner columns 20 of a base 22. The columns 20 are connected by the longitudinal brace pipes or members 23 and the transverse brace members 24. The two columns on each side of the base 22 are connected to a longitudinally extending foot members 25 and the foot members in turn may be rigidly connected by the transverse connector members 26. The base 22 may be formed of pipe or other tubular members welded to one another.

The oppositely and outwardly extending horizontal flanges 28 of the lower angle frame members 19 rest upon the upper ends of the columns of the base and are rigidly secured thereto in any suitable manner as by welding. The two longitudinally extending parallel lower frame members 19 may be connected to one another by transverse brace members 30. The support frame 18 also includes an upper pair of longitudinal angle members 32 and 33 which are supported by vertical angle members 35 whose opposite ends are rigidly secured to the upper and lower longitudinal frame members.

The bin 15 includes a pair of longitudinal vertical sides 36 and 37 which extend upwardly between the upper longitudinal frame members 32 and 33 and are rigidly secured thereto in any suitable manner as by welding. The longitudinal vertical sides 36 and 37 of the bin 15 extend upwardly above and on either side of the upper horizontally extending section or portion 40 of the path of movement of the conveyor to prevent the material deposited thereon from falling laterally off the sides of the conveyor. The downwardly convergent transverse sides 42 and 43 of the bin 15 extend from immediately below the upper horizontal section 40 of the conveyor to an arcuate trough 44 through which extends a screw conveyor 45 for moving the peanuts which fall through the screen conveyor into the bin outwardly through a suitable discharge opening in the longitudinal side 37 of the bin and the laterally outwardly extending chute 46 from which the peanuts fall by gravity into any suitable receptacle or storage structure. The screw conveyor 45 has a shaft 47 extending through a suitable bearing 48 rigidly secured to the vertical closure plate 49 closing one end of the trough and is connected in any suitable manner to the drive shaft 50 of the electric motor 51. The other end of the screw conveyor shaft extends outwardly of the other longitudinal side 37 and is journaled in a suitable bearing 53 mounted on a support plate 54 rigidly connected to the support frame by a pair of members 55 whose upper ends are rigidly secured to the upper longitudinal frame member 33 and which extend downwardly and laterally outwardly so that the bearing 53 and support plate 54 are spaced from the longitudinal side 37 to provide clearance between the support plate and the outer end of the chute to permit the peanuts moved from the bin to fall by gravity into any suitable storage building over which the separating apparatus is disposed. The vertical closure plate may be braced by the vertical angle member brace 57 whose upper end is rigidly secured to the upper longitudinal frame member 32. The motor 51 is mounted on a pair of channel spacer members 60 by means of the usual bolts 62 thereof. The channel spacer members are rigidly secured to an inverted laterally outwardly extending base channel 63 which extends laterally outwardly from the lower longitudinal frame member 19 and is rigidly secured thereto in any suitable manner, as by welding.

The endless screen conveyor 14 extends about the transversely spaced drive sprockets 65 mounted on the transverse drive shaft 66 rotatably supported by the pillow blocks 67 and 68 secured to the upper longitudinal frame members 32 and 33, respectively, in any suitable manner as by the bolts 69. The drive shaft 66 is rotated by means of the chain drive sprocket 71 rigidly mounted thereon and a drive chain 72 which extends about the chain drive sprocket and the sprocket 73 on the output shaft 74 of a speed reducing transmission 75. The input shaft 77 of the speed reducing transmission is connected to the drive shaft 50 of the electric motor 51 by means of the belt 78 which extends about the pulleys 79 and 81 rigidly secured to the motor shaft 50 and the input shaft 77, respectively. The speed reducing transmission is mounted by means of the bolts 82 to a flanged channel member 83 which extends laterally outwardly from the lower longitudinal frame member 19 and is rigidly secured thereto in any suitable manner, as by welding. The screen conveyor also extends across the transversely spaced idler or direction changing sprockets 86 mounted on an idler shaft 87 rotatably supported in pillow blocks 88 rigidly secured to the upper longitudinal frame members 32 and 33 in any suitable manner, as by means of the bolts 90. The idler shaft 87 is mounted below the feed plate 13 and extends parallel to and at substantially the same height as the drive sprocket shaft 87 so that the section of the screen conveyor 14 extending between the idler sprockets 86 and the drive sprockets 65 is substantially horizontal and moves forwardly from beneath the lower end of the feed plate between the upper end of the longitudinal vertical sides 36 and 37 of the bin 15 and over the upper edges of the downwardly convergent transverse walls or sides 42 and 43 of the bin 15. The upper edge of the transverse side 42 is disposed immediately forward of the idler sprockets 86 and below and rearwardly of the forward lower edge of the feed plate and the upper edge of the transverse side 43 is disposed immediately rearwardly of the drive sprockets 65 so that all objects moving off the feed plate onto the screen conveyor, and smaller than the apertures of the conveyor, will fall through the apertures into the bin 15.

The screen conveyor also engages and extends about the lower transverse guide rollers 92 and 93. The guide roller 92 is mounted on a shaft 94 whose opposite ends are journaled in pillow blocks 95 mounted on the lower longitudinal members 19 of the support frame and the roller 93 is mounted on a rotatable shaft 96 whose opposite ends are rotatably mounted in suitable pillow blocks 98 also mounted, as by means of the bolts 99, on the lower frame members. The rollers 92 and 93 are thus spaced below and between the shafts 66 and 87 of the drive and idler sprockets so that the section 101 of the screen conveyor between the drive sprockets and the guide roller 93 extends downwardly and rearwardly at an angle whereby objects which have not fallen through the apertures of the conveyor into the bin 15 are carried by the screen conveyor beyond the upper edge of the forward transverse side 43 and will fall by gravity off the screen conveyor as they move therewith over the drive sprockets.

The screen conveyor may be formed of a plurality of transversely extending planar members 100 which have longitudinal forwardly convergent sections 101 connected at their forward ends by the transverse sections 103 and at their rear end by the transverse sections 104. The forward transverse sections 103 of each conveyor member 100 are disposed forwardly of the rear sections 104 of the immediately adjacent forwardly located conveyor member with the forward portions of the longitudinal sections which are telescoped forwardly between the rear portions of such adjacent forwardly located member. The conveyor members 100 are pivotally connected by transverse links or rods 105 which extend through aligned apertures in the telescoped portions of the longitudinal sections of each pair of adjacent members. The links are secured against displacement by the hooks 106 provided at their extreme ends which extend through suitable apertures in the extreme end longitudinal sections 101a of each conveyor member. The longitudinal sections 101 of the conveyor members are longer than the transverse sections 103 and 104 thereof so that the apertures 107 defined by these members are substantially rectangular and of greater length than width.

The flat rear surfaces 104a and 103a of the transverse sections of the conveyor members of the horizontally moving upper section 40 of the conveyor are disposed perpendicularly and since their width or height is substantially great, the forward ends of any elongate objects, such as sticks, which may be sliding longitudinally angularly downwardly off the feed plate, will engage such flat rear surface and their downward movement arrested so that they are prevented from falling longitudinally downwardly through the apertures 107 even though their thickness or cross-sectional dimension is much smaller than the width or length of the apertures 107 of the chain conveyor. Since the speed of forward movement of the screen conveyor is, as will be explained below, greater than the speed of forward movement of the objects sliding off the lower end of the feed plate 13, the engagement of the forward ends of any sticks of greater length than the length of the apertures 107, by the transverse members of the conveyor tends to pull the forward ends of the sticks forwardly before the forward downward longitudinal movement of their forward ends can cause them to assume longitudinal vertical positions which would permit them to fall downwardly through the apertures 107 of the conveyor.

The dispensing device 12 includes a rectangular duct 110 which extends transversely of the support frame and has rear and forward transverse walls 111 and 112 and lateral walls 113 which are provided adjacent their lower ends with support angle members 114 rigidly secured thereto in any suitable manner, as by welding, whose horizontal outwardly extending flanges rest upon the horizontal angle members 116 supported on the upper ends of the rear pair of columns 35 and the rear vertical angle member 115 which extend upwardly from the extreme rear end portions of the lower longitudinal frame members 19. The angle members 114 and 116 may be rigidly secured in any suitable manner, as by the bolts 117. The feed plate 13 extends forwardly and downwardly from an intermediate portion of the rear end wall 111 to a point below and spaced from the lower edge of the forward end wall 112 whereby the mixture of peanuts and debris deposited thereon may slide down the feed plate and out the aperture or the longitudinal slot 118 between the lower edge of the forward wall and the upper surface of the feed plate. A dispensing rotor 119 extends transversely between the lateral sides of the duct and the opposite ends of its shaft 119a, are journaled in the lateral sides 113 of the duct in any suitable manner, as by means of the bearings 119b. The dispensing rotor has a plurality of circumferentially spaced radially outwardly extending flanges 120 to which are secured in any suitable manner, as by bonding, riveting or the like, radially outwardly extending resilient vanes 121 whose outer edges are engageable with the internal surfaces of the arcuate closure sections 122 and 123 of the guide members 124 and 125, respectively, which extend between the lateral walls 113 of the duct. The upper slide portions 126 and 127 of the guide members 124 and 125, respectively, extend convergently inwardly from the upper edges of the rear and forward walls and are spaced at their lower ends at their junctures with the arcuate closure sections to define the transversely extending slot or throat 128.

The storage hopper 11 has downwardly convergently sloping rear and forward walls 129 and 130 which have vertical lateral sides 131 and 132. The vertical lower flanges 133 of the rear and forward walls and the lower ends of the lateral walls are secured to the duct 110 of the dispensing device 12 by means of the angle members 135 rigidly secured to the vertical flanges and the lateral sides whose outwardly extending horizontal flanges rest upon and are rigidly secured to similar angle members 136 rigidly secured to the upper ends of the rear and lateral walls of the duct 110 and are secured thereto in any suitable manner, as by the bolts 137.

It will be apparent that the mixture of peanuts and debris deposited in the upper open end of the storage hopper 11 is directed by the convergently downwardly sloping rear and forward walls 129 and 130 of the storage hopper to the upper open end of the rectangular duct 110 of the dispensing device and onto the convergent slide sections of the guide members 124 and 125. The slide sections of the guide members then cause movement of such mixture through the upwardly opening throat 128 into the elongate transversely extending compartments 138 of the dispensing rotor between each pair of the vanes 116 as the rotor rotates to place the compartments successively in alignment with the throat.

It will be apparent that, as the rotor is rotated, each such longitudinal rotor compartment sequentially opens upwardly through the throat or slot 128 to the storage hopper to receive a measured or predetermined quantity or volume of the mixture therefrom, is closed due to the engagement of the outer edges of its vanes with the arcuate closure section 122 of the rear guide member, opens downwardly between the lower spaced ends of the closure sections to permit the mixture held therein to fall onto the feed plate 13, and is again closed by the engagement of the outer edges of its vanes with the closure section 123 of the forward guide member. The rate of deposition of the mixture on the feed plate is thus dependent on the speed of rotation of the dispensing rotor. The resilient substance of which the vanes 121 are formed permits the vanes to deflect or deform as required to prevent jamming of the vanes in the event a stick or other object becomes lodged between the vanes and the guide members.

The aspirator device or mechanism 16 includes a vertical duct 140 which extends transversely between the vertical longitudinal walls 36 and 37 of the bin 15 and opens downwardly above the conveyor and the extreme lower edge portion of the feed plate so that the mixture moves off the lower edge of the feed plate toward the screen conveyor, light debris moved upwardly through the duct into a settling compartment 142 of the aspirator housing 143 by air which is moved upwardly through the duct. The aspirator duct is defined by the forward wall 112 of the dispensing mechanism duct 110 and by a wall 144 which extends downwardly from the upper edge of the downwardly and forwardly extending rear transverse wall 145 of the aspirator housing. The aspirator housing also includes a forwardly and upwardly extending forward transverse wall 147 having a vertical upper flange 148. The rear and forward walls 145 and 147 converge downwardly toward and are secured to the arcuate transverse trough 150 of the aspirator housing. The vertical lateral walls 151 of the aspirator housing and of the aspirator duct are forward extensions of the lateral walls 113 of the rectangular duct 110 of the dispensing device. The upper end of the aspirator housing is closed by a cover plate 154 secured to the horizontal flanges of the longitudinal support angle members 136 and to the transverse support angle member 155 secured to the vertical flange 148. The forward ends of the longitudinal support angle members are supported by the vertical angle members 156 which extend upwardly from the upper longitudinal frame members 32 and 33. The cover plate extends from the support angle member 136 secured to the vertical lower flange 133 of the forward wall of the storage hopper. The cover plate may be secured to the support angle members by bolts or screws 158. Any suitable sealing or gasket means (not shown) may be interposed between the angle support member and the cover plate to prevent flow of air into the housing therebetween.

The aspirator housing is divided into the settling compartment 142 and a suction compartment 159 by a transverse partition 160 which extends transversely between the lateral walls thereof. A suitable suction device 162 is mounted in the suction compartment and may include the usual housing 163 in which a squirrel cage 164 blower or fan is rotatably mounted, by means of the shaft 165, to pull air from the interior of the aspirator housing through the usual side openings of the blower housing 163 and to the exterior of the blower and aspirator housings through the exhaust duct 166 which extends through a suitable aperture in the cover 154.

A screw conveyor 170 is rotatably mounted in the trough 150 and its shaft 171 may extend through and be rotatably supported by one of the lateral walls 151 of the aspirator housing which closes one end of the trough by means of any suitable bearing. The opposite end portion of the conveyor shaft may be suitably journaled in a bearing mounted on the outer wall 172 of a duct 173 into which the trough opens. The duct is connected to and opens downwardly into a suitable closed container or storage structure so that during operation of the aspirator device no air can flow upwardly through the duct 173 into the aspirator housing while at the same time the conveyor will move the debris accumulating in the trough outwardly into the upper end of the duct and thence into the closed container.

The dispensing device rotor 119, the screw conveyor 170 and the blower are simultaneously rotatable by an electric motor 195 whose base 196 is vertically adjustably secured to the support frame 18 by one or more adjusting screws 198 which extend through threaded apertures in the flanges 199 of the motor base. The adjusting screws are mounted on a bracket 200 relative to which they are rotatable but not longitudinally movable. The adjusting screw bracket is rigidly secured to the transversely extending horizontal flange of the support angle members 116 of the duct of the dispensing device in any suitable manner, as by welding. The adjusting screws have handles 202 by means of which they may be easily rotated. The motor is rigidly secured in any adjusted position on the adjusting screw or screws by means of the lock nuts 203 also threaded on the adjusting screws. It will be apparent that when it is desired to vary the vertical position of the motor relative to the support frame 18, the lock nuts are loosened and the adjusting screws are rotated to cause the motor base to move upwardly or downwardly on the screws until it is in the desired vertical position whereupon the lock nuts are tightened and thereafter hold the motor immovable on the screw or screws. This adjustable mounting of the motor is provided in order to permit installation and tensioning of the drive chain 205 which extends about the sprocket 206 rigidly secured to the drive shaft 207 of the motor 196 and about the sprocket 210 rigidly secured to a shaft 211. The shaft 211 is rotatably supported by a pair of pillow blocks 212 mounted on the rear vertical posts 35 of the support frame by means of the bolts 213.

The dispensing motor 119 is connected to the drive shaft of the motor by means of the endless chain 215 which extends about the large sprocket 216 rigidly connected to the shaft 119a of the rotor and the small sprocket 220 rigidly secured to the shaft 211. The screw conveyor 170 of the aspirator device is connected to the motor by means of the endless chain 221 which extends about the large sprocket 223 rigidly secured to the shaft 171 of the screw conveyor and a second small sprocket 225 rigidly secured to the shaft 211. The squirrel cage blower 164 of the aspirator device is connected to the motor by means of the endless chain 226 which extends about a small sprocket 227 rigidly mounted on the shaft 165 thereof and the large sprocket 228 rigidly connected to the shaft 171. The shaft 165 of the squirrel cage blower 164 extends outwardly of a longitudinal vertical wall 151 of the aspirator housing and may be rotatably supported thereon by means of any suitable bearing or mounting means.

It will be apparent that the shaft 211 and the various chains and sprockets by which it is connected to the drive shaft of the motor and to the shafts of the dispensing rotor, the screw conveyor of the aspirator device and the squirrel cage blower 164 constitute a mechanical transmission by means of which the motor drives these three different movable elements of the apparatus at different desired speeds and in the proper directions.

In use, when it is desired to utilize the sorting apparatus to separate such objects as peanuts from debris intermixed therewith, the motors 51 and 195 are energized. The motor 51 now causes the endless screen conveyor to be moved continuously in a closed or continuous path by the drive sprockets 65 mounted on the drive shaft 66, the screen conveyor moving in the upper horizontal section of its path of movement above the bin 15. The provision of the transversely spaced drive sprockets 65, which engage either the transverse sections 104 of the transverse members 100 of the transverse links or rods connecting the transverse members and assures that the proper uniform tension throughout its width is maintained on the portion of the conveyor moving in the horizontal portion of the path of movement between the idler sprockets 86 and the drive sprockets. The screw conveyor 45 is now also rotated in the trough 45 and moves any material which falls into the bin through the apertures 107 of the screen conveyor out the open end of the trough and the chute 46 to fall into any suitable bin or storage structure. The energization of the motor 195 causes the squirrel cage blower 164 to draw air up through the aspirator duct 140 into the settling compartment of the aspirator housing and then through the open sides of the blower housing to the exterior through the exhaust duct 166 thereof. The screw conveyor 170 of the aspirator device moves any debris falling into the trough 150 outwardly of the aspirator housing into the upper end of the duct 173 through which it falls into a suitable closed container to which its lower end is connected. The rotor 119 of the dispensing device 12 also rotates.

When a load of peanuts intermixed with debris is now deposited in the storage hopper 11, it moves downwardly in the storage hopper to the upper end of the rectangular duct 110 of the dispensing device 12 and the rotation of the dispensing rotor 119 causes this mixture to be moved from the storage hopper and fall on the feed plate 13 at a predetermined rate or predetermined volume per unit of time which is determined by the speed of rotation of the dispensing rotor 19 and the capacity of the compartments 138 between the radially outwardly extending vanes 121 thereof. As each blower vane 121 moves out of engagement with the internal surface of the closure section 122 of the rear guide member 124, the mixture from the compartment whose lower side is defined by such vane falls onto the feed plate 13 and slides downwardly and forwardly thereon through the throat 118 between the lower edge of the rear wall 112 of the dispensing duct 110 and the upper surface of the lower end portion of the feed plate and off the feed plate immediately below the lower open end of the aspirator duct 140. The upward movement of the air through the mixture sliding or moving off the lower end of the feed plate and into the aspirator duct 140 causes light debris, such as leaves and the like, to be drawn upwardly with the air through the aspirator duct 140 into the settling compartment 143 of the aspirator housing and to settle into the trough 150 since the velocity of the air moving through the exhaust duct 140 is much greater than the velocity of the air moving through the relatively large aperture between the trough 150 and the lower end of the partition 160 which divides the interior of the housing into the settling compartment and the suction compartment 159. The debris which settles into the trough is moved outwardly of the aspirator housing by the screw conveyor 170 into the duct 173 and thence into a closed container or chamber (not shown).

The remaining mixture of peanuts and larger or heavier debris slides off the lower forward edge of the feed plate onto the screen conveyor. Since the speed of forward movement of the conveyor moving in the horizontal section 40 of the path between the idler sprockets 86 and the drive sprockets 65 is greater than the speed of the downward and forward movement of the objects off the lower end of the feed plate, any elongate objects, such as sticks which are moving longitudinally downwardly and forwardly off the plate have their forward end portions engaged by the transverse sections 103 or 104 of the transverse members 100 of the screen conveyor before such sticks may assume a longitudinally vertical position and fall through one of the apertures 107 of the conveyor into the bin 15 if the stick is of sufficient length to span the apertures 107. The flat planar vertical surfaces 103a and 104a of the transverse sections 103 and 104, respectively, of the transverse members 100 of the conveyor engage the forward ends of any objects which may be sliding off the feed plate at a momentarily greater speed than the speed of forward movement of the conveyor and thus arrest any forward movement of such sticks relative to the conveyor, prevent their downward movement through the openings 107 into the bin 15. Any elongate debris, such as sticks, which may slide off the plate with its longitudinal axes aligned with the transverse axes of the screen conveyor will of course span the apertures 107 and be supported by the longitudinally extending sections 101 of the conveyor members 100. Such long sticks are now moved by the conveyor through the horizontal section or portion of its path of movement. The peanuts and other debris which is of smaller dimensions than the openings of the screen conveyor fall downwardly through the openings into the bin and are directed by the downwardly convergent rear and front walls 42 and 43 to the trough 44, and are moved through the open end of the trough and the chute 46 into a suitable storage structure on which or above which the separating apparatus is supported by means of the base 22.

It will thus be apparent that even though the long objects may be of smaller cross-sectional dimension than the dimensions of the openings of the screen conveyor and the cross-sectional dimensions of the peanuts from which they must be separated, such sticks or elongate objects will not fall through the openings since the forward speed of movement of the mixture onto the conveyor from the feed plate, predetermined by the angle of slope or inclination of the feed plate and the rate of deposition or dispensing of the mixture onto the feed plate, less than the speed of forward movement of the conveyor and the engagement of such elongate debris, such as sticks, by the transverse members of the conveyor causes them to assume horizontal positions upon the screen conveyor and prevents them from assuming longitudinally vertical positions.

It will further be noted that the throat 118 may be of such height that engagement of the lower edge of the rear wall 112 of the dispensing duct defining the upper edge of such throat or slot 118 with elongate bodies tends to prevent any such body from moving onto the conveyor in substantially longitudinally vertical positions so that this coaction between the slide plate and the lower edge of the rear wall of the dispensing duct further assists in the prevention of the movement of such elongate sticks through the openings of the screen conveyor and that such elongate objects, and also any other debris of larger dimensions than the dimensions of the openings 107 of the screen conveyor, are carried or transported by the conveyor through the horizontal section of its path of movement, fall off the conveyor as the conveyor changes its horizontal direction of movement to a downward and rearward direction as it is moved by and about the drive sprockets.

It will now be seen that the new and improved separating apparatus may be used to separate objects of greater length from objects of shorter length even though the cross-sectional dimensions or thicknesses of such longer objects may be less than the thickness or cross-sectional dimensions of such shorter objects.

It will further be seen that the separating apparatus includes an endless screen conveyor movable through a continuous path having an upper longitudinal portion or section, a dispensing means for depositing a mixture of the long and short objects onto a feed means, such as the feed plate 13, which causes the mixture to move onto the conveyor at the rear end of the horizontal section of its path of movement and in the direction of movement of the screen conveyor.

It will further be seen that the separating apparatus includes a means for depositing or dispensing the mixture at a predetermined rate onto a feed plate having a downward and forward inclination which causes the speed of forward movement of the objects in such mixture as they move off the feed plate and onto the conveyor to be less than the speed of forward movement of the conveyor.

It will further be apparent that the sorting apparatus may also include an aspirator device for separating light debris from the mixture moving off the feed plate and onto the screen conveyor by causing air to move upwardly through the mixture.

It will further be apparent that the horizontal section 40 of the path of movement of the endless conveyor is between a pair of vertical longitudinally extending walls 36 and 37 of a bin 15 which prevent the objects deposited upon the conveyor from falling off the sides of the conveyor and that the horizontal section of the path of movement of the conveyor is above and between the upper edges of the transverse walls of such bin, the edge of the rear wall being spaced rearwardly of the forward lower edge of the feed plate, whereby all objects moving onto the conveyor from the feed plate which fall through the openings of the conveyor are received in the bin and are continuously removed therefrom by the screw conveyor 45 and that objects so separated and transported by the conveyor fall off the conveyor at the end of the horizontal section of its path of movement so that the separating apparatus may operate continuously without the necessity of stopping operation thereof for the removal of the separated objects either from the conveyor or from the bin.

Referring now particularly to FIGURES 7 and 8 of of the drawing, the separating apparatus 150 is substantially similar to the separating apparatus 10 and accordingly corresponding elements of the sorting apparatus 150 have been provided with the same reference numerals, to which the suffix "a" has been added, as the corresponding elements of the separating apparatus 10.

The separating apparatus 250 differs from the apparatus 10 in that it is not provided with an aspirator device, such as the aspirator device 16, and that the feed device 13a includes a shaker screen 251 upon which the mixture from the storage hopper 11a is deposited by the dispensing device 12a. The shaker screen 251 has openings or perforations which are smaller than the cross-sectional dimension of the objects, such as peanuts, which are to be deposited in the bin 15a. Debris or objects which are of smaller dimensions than the cross-sectional dimensions of the peanuts fall downwardly through the perforations and are thus separated from the larger objects of the mixture. The screen 251 disposed immediately below the lower end of the rectangular duct 110a of the dispensing device 12a and is supported by a plurality of support links 252 whose lower ends are pivotally secured by the pivot pins 253 to side plates 254 and 255. The side plates are rigidly secured, as by welding, to the upper longitudinal frame members 32a and 33a and extend upwardly above and on either side of the screen to prevent mixture deposited on the screen from falling off the sides thereof. The rear links 252a have their upper ends pivotally connected to the rear dependent lugs 256 of the screen 251 by the pins 257 while the upper ends of the forward links 252b are pivotally connected to the dependent forward lugs 258 by the transversely extending shaft 260. Oscillatory movement is imparted to the screen 251 by a transmission device 262 whose rotatable output shaft 263 has a drive disk 264 rigid therewith. The drive disk is connected to one of the rear links 252a by a drive link 266, one of whose ends is pivotally connected to the drive disk 264, eccentrically of the axis of rotation of the drive disk, by a pin 267 and whose other end is pivotally connected to one of the rear support links 252a intermediate the ends thereof by the pivot pin 268.

It will be apparent that when the output shaft 263 of the transmission 262 is rotated, an oscillatory movement, upward and forward and then rearward and downward, is imparted to the screen whereby the mixture deposited thereon is moved forwardly thereby and also shaken so that the small objects of the mixture may fall through the perforations of the screen 251 while the remaining larger objects are moved off the forward edge of the screen onto a slide or feed plate 270. The rear upper end of the slide plate is pivotally secured to the pivot shaft 260 and its lower forward edge is slidably supported on the horizontal flanges 271 of the support angles rigidly secured to the walls 36a and 37a of the bin 15a above the horizontal section 40 of the path of movement of the screen conveyor 14a.

The rectangular duct 110a of the dispensing device is supported immediately above and slightly spaced from the shaker screen by the rear transverse angle support member 275 secured to the lower end of the rear wall 211a and by the angle support members 114a secured to the lower ends of the lateral walls 113a of the dispensing duct. These angle support members are secured to the upper ends of the posts 115a and the rear pair of posts 135a. The lower edges of the lateral sides 113a of the duct 110a rest on the rear portions of the upper edges of the side plates 254 and 255.

The forward wall 112a of the dispensing duct 110a has its lower edge 277 spaced above the lower edges of the lateral and rear walls thereof. A vertically slidable door whose extreme lateral vertical edge portions are received between the rear wall and the vertical slide guides 280 secured to the side plates 254 and 255 is provided to adjust the height of the aperture or slot or transversely extending slot 118a between the upper surface of the screen 251 and the lower edge of the rear wall to thereby control the rate of forward movement or feed of the mixture deposited upon the screen by the rotor 119a of the dispensing device. Any suitable clamp or screw means may be provided for holding the door in any vertically adjusted position.

The input shaft 280 of the shaker transmission 262 is connected to the shaft 211a by a chain 281 which extends about the sprocket 282 connected to the input shaft 280 and the sprocket 283 connected to the shaft 211a. The motor 195a, rigidly mounted on a post 115a as by means of the bolts 286, rotates the shafts 211a by means of the chain 205a which extends about the sprocket 206a rigidly secured to the drive shaft of the motor and the sprocket 210a rigidly secured to the shaft 211a. The rotor 119 is driven by the chain 215a which extends about a sprocket rigidly secured to the shaft 211a and a sprocket 216a rigidly secured to the shaft 119a of the dispensing rotor 119. It will now be apparent that the motor 195a drives both the dispensing device 112a which dispenses the mixture from the storage hopper 11a at a controlled rate onto the feed device 13a, and the mechanism for shaking the feed device 13a which includes a screen 251a and the slide or feed plate 270. When the separating apparatus is in operation, the dispensing device 119a dispenses or transfers the mixture of such objects as peanuts and debris from the storage hopper 11a and onto the screen 251 which is being shaken or oscillated by the transmission mechanism 262 in such manner that the oscillatory motion thereof moves the objects deposited thereon forwardly through the throat or slot 118a. The agitation or movement imparted to the objects moving over the screen by such oscillatory motion of the shaker screen causes the objects of smaller cross-sectional dimensions than the peanuts to fall downwardly through the apertures of the screen. The peanuts and the larger objects, such as sticks, are moved onto the slide or feed plate 270 and then over the feed plate and off the lower end thereof onto the screen conveyor 14a. The screen conveyor 14a carries or transports large or elongate objects while permitting the smaller objects such as the peanuts to fall through the openings thereof into the bin 15a. The degree of the downward and forward slope or inclination of the feed plate and the amplitude of the oscillatory movement imparted thereto is such that the speed of forward movement of the peanuts and long objects off the lower end of the feed plate is substantially slower than the speed of forward movement of the screen conveyor 14a so that the separating device 250, like the separating device 10, prevents long objects, such as sticks, from falling through the openings of the screen conveyor into the bin even though the cross-sectional dimensions or thickness of such long sticks are substantially smaller than the dimensions of the openings.

It will be apparent that while the feed plate has been shown connected to the shaker screen and is therefore also oscillated, it may be rigidly secured in any suitable manner, as by welding, to the side plates 254 and 255, and with its upper edge free from and disposed below the forward portions of the shaker screen. The connection of the feed plate to the shaker screen is preferred however since the angle of inclination or shape of the feed plate from the horizontal may be held to a minimum if such oscillatory movement is imparted to the feed plate to assist in moving the mixture thereover to the conveyor.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A separating apparatus including: an endless screen conveyor having a plurality of openings, said screen conveyor having transversely extending planar members providing vertical planar surfaces defining transverse forward and rear ends of said openings; means for moving said conveyor in a predetermined path having a horizontal section; a feed plate disposed above said screen conveyor above the horizontal section of the path of movement of the conveyor and inclined angularly downwardly in the direction of movement of said screen conveyor in said horizontal section of said path of movement; storage means; dispensing means for dispensing a mixture of objects of different dimensions from said storage means onto said feed plate at a predetermined rate, said dispensing means including a duct opening upwardly to said storage means, said duct having a wall spaced at its lower edge above said feed plate and defining with said feed plate a slot extending transversely relative to the direction of movement of said screen conveyor in said horizontal section of said path of movement, a dispensing rotor rotatably mounted in said duct and having a plurality of radially outwardly extending vanes, and means in said duct operatively associated with said rotor preventing movement of objects from said storage means to said feed plate when said rotor is not rotating; drive means for simultaneously operating said dispensing rotor and said conveyor, said feed plate and said dispensing means cooperating to move said objects onto said conveyor at a speed of movement thereof in the direction of movement of said conveyor in said horizontal section of its path slower than the speed of movement of said conveyor whereby objects of greater length than the dimension of the openings of the screen conveyor parallel to the direction of movement of said conveyor in said horizontal section of its path of movement are carried by the conveyor through said horizontal section of its path of movement while objects of smaller length than the openings fall therethrough, said vertical planar surfaces defining forward ends of said openings engaging forward ends of objects of greater length moving off said feed screen to prevent such elongate objects from assuming longitudinally vertical positions and falling through the openings; and receiving means disposed below said horizontal section of the path of movement of said conveyor for receiving the objects which fall through the opening of the conveyor.

2. The separating apparatus of claim 1, and moving means for moving objects from said receiver means, said drive means operating said moving means simultaneously with the operation of said screen conveyor and said dispensing means.

References Cited by the Examiner

UNITED STATES PATENTS

| | | | |
|---|---|---|---|
| 292,750 | 1/1884 | Hungerford | 209—37 |
| 332,470 | 12/1885 | Zink | 209—245 |
| 595,523 | 12/1897 | Cherry | 209—245 |
| 693,025 | 2/1902 | Jessup | 209—283 |
| 920,499 | 5/1909 | Sutter | 209—125 |
| 1,013,040 | 12/1911 | Morse | 209—307 |
| 1,513,482 | 10/1924 | Brown | 209—125 |
| 2,043,978 | 6/1936 | Barber | 209—321 |
| 2,974,797 | 3/1961 | Blackman | 209—307 |

FOREIGN PATENTS

| | | |
|---|---|---|
| 457,797 | 7/1913 | France. |
| 275,380 | 8/1927 | Great Britain. |

HARRY B. THORNTON, *Primary Examiner.*

HERBERT L. MARTIN, *Examiner.*